US012668193B2

(12) United States Patent
Hughes

(10) Patent No.: US 12,668,193 B2
(45) Date of Patent: Jun. 30, 2026

(54) GLOVE BOX HINGE DETENT DEVICE

(71) Applicant: Hawg Wired, Fremont, CA (US)

(72) Inventor: Paul T. Hughes, San Jose, CA (US)

(73) Assignee: Hawg Wired, Fremont, CA (US)

( * ) Notice: Subject to any disclaimer, the term of this patent is extended or adjusted under 35 U.S.C. 154(b) by 372 days.

(21) Appl. No.: 18/462,951

(22) Filed: Sep. 7, 2023

(65) Prior Publication Data

US 2024/0083365 A1     Mar. 14, 2024

Related U.S. Application Data

(60) Provisional application No. 63/404,854, filed on Sep. 8, 2022.

(51) Int. Cl.
B60R 7/06          (2006.01)
E05D 11/08         (2006.01)
*E05C 17/44*          (2006.01)
*E05C 19/18*          (2006.01)

(52) U.S. Cl.
CPC .............. B60R 7/06 (2013.01); E05D 11/082 (2013.01); *E05C 17/44* (2013.01); *E05C 19/188* (2013.01)

(58) Field of Classification Search
CPC .......... B60R 7/06; E05F 11/02; E05D 11/082; E05Y 2201/221; E05Y 2900/538; E05C 17/025; E05C 17/44; E05C 17/16; E05C 17/52; E05C 19/007; E05C 19/06; E05C 19/188

USPC ..................................... 296/37.1, 37.8, 37.12
See application file for complete search history.

(56) References Cited

U.S. PATENT DOCUMENTS

2006/0273090 A1* 12/2006 Katagiri ................... B60R 7/06
                                                                220/264
2017/0298672 A1* 10/2017 Proetta .................... E05C 17/44

FOREIGN PATENT DOCUMENTS

GB            2627269 A  *  8/2024  ............... B60R 7/06

* cited by examiner

*Primary Examiner* — Roger L Pang
(74) *Attorney, Agent, or Firm* — David R. Stevens; Stevens Law Group

(57)          ABSTRACT

Glove box hinge detent devices are disclosed. One aspect includes a curved plate configured to conform to a curvature of a door of a vehicle glove box, and two ball plungers attached to the curved plate. When the door is opened via a first external force to a first spatial position, the ball plungers are pushed against an edge of the vehicle glove box. With a further force applied to extend the door beyond the first spatial position, the ball plungers are depressed by the edge from a first and a second resting state, allowing the door to be extended beyond the first spatial position. When the door is extended beyond the first spatial position, the ball plungers return to the first resting place and the second resting place. The door is held open at a second spatial position by the ball plungers resting against the edge.

21 Claims, 5 Drawing Sheets

GLOVE BOX HINGE DETENT DEVICE

RELATED APPLICATION

The present disclosure is part of a non-provisional patent application claiming the priority benefit of U.S. Patent Application No. 63/404,854, filed on Sep. 8, 2022, which is incorporated by reference in its entirety.

BACKGROUND

Technical Field

The present disclosure relates to a device mounted to a door of a glove box of a vehicle and configured to hold open the door via one or more spring-loaded detent mechanisms.

BACKGROUND ART

Glove boxes are commonly used on vehicles such as automobiles and motorcycles for storage. Some glove box designs, however, are inconvenient in the sense that they have doors that open in an upward direction, and need to be held open while putting in or taking out an item from such a glove box, or accessing an interior space of the glove box. In other words, if such a door is not supported by a person's hand or in some other manual way when opened, the door falls into a closed position due to the action of gravity. Such glove boxes are found on, for example, motorcycles.

SUMMARY

Aspects of the invention are directed to a detent device that installs onto the hinge of a glove box with a door that opens in an upward direction and requires external support to be held open. The detent device is configured to hold the door open without the need for an external force or external support from a user.

One aspect includes a curved plate including a first surface and a second surface, wherein the first surface is configured to conform to a curvature of a curved portion of a door of a vehicle glove box. A first ball plunger and a second ball plunger may be attached to the curved plate. The curved plate may be adhered to the curved portion of the door via the first surface. When the door is opened via a first external force to a first spatial position, the first ball plunger and second ball plunger may be pushed against an edge of the vehicle glove box. With a further force applied to extend the door beyond the first spatial position, the first ball plunger and the second ball plunger may be depressed by the edge from a first resting state and a second resting state, respectively, allowing the door to be extended beyond the first spatial position. When the door is extended beyond the first spatial position, the first ball plunger and the second ball plunger can return to the first resting state and the second resting state, respectively, and the door is held open at a second spatial position by the first ball plunger and the second ball plunger resting against the edge.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
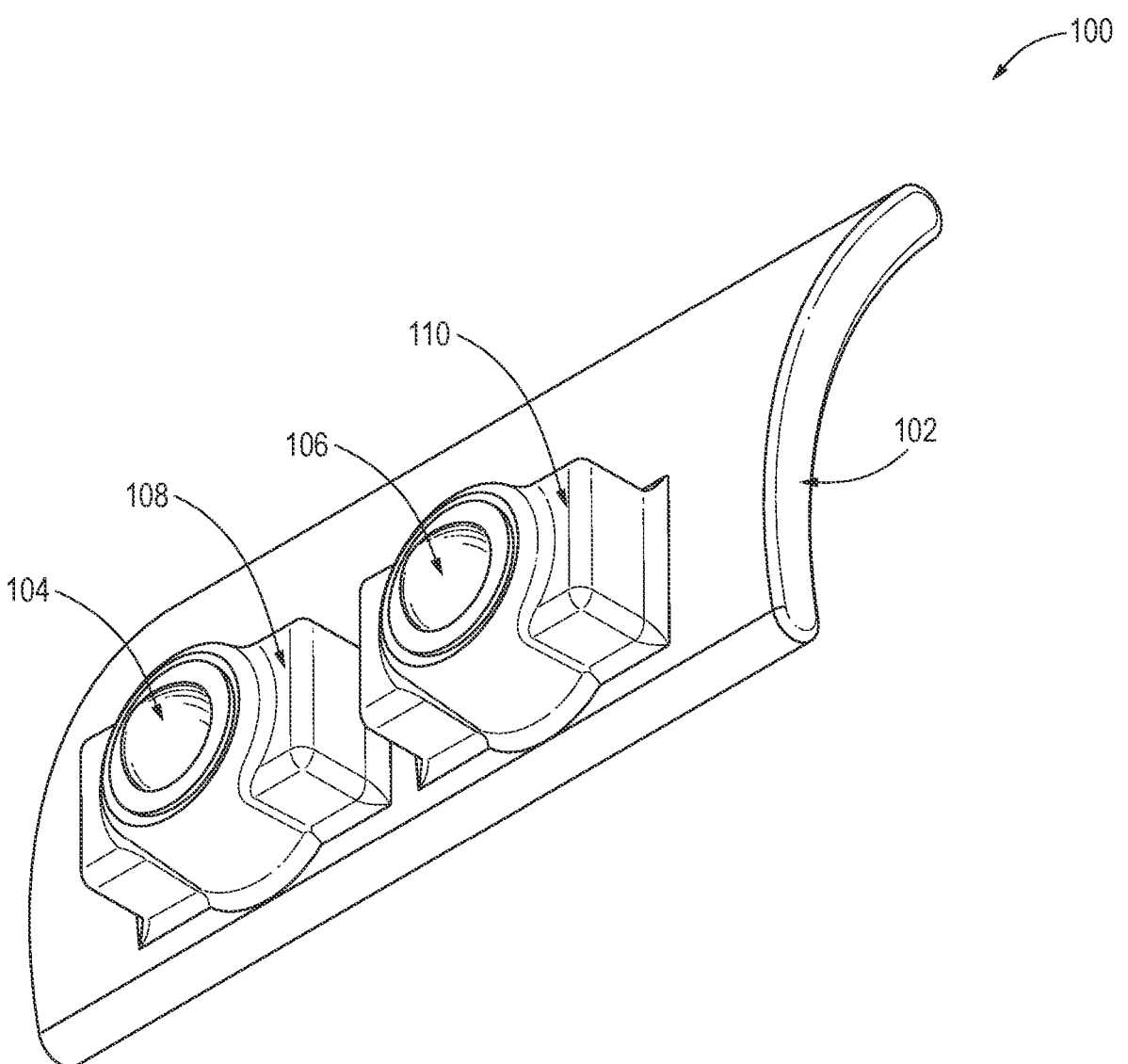
FIG. 1A is an isometric view of a detent device.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein disclose a vehicle glove box attachment configured to hold open a door of the vehicle glove box, where the glove box door requires external support to be held open. Such glove boxes may be found installed on motorcycles. Ordinarily, a user accessing an interior space in the glove box would need to hold the door open with one of their hands while accessing the interior space. Doing so can be inconvenient for the user, especially if a task associated with accessing the interior space requires usage of both the user's hands. The detent device described herein attaches to the glove box door, and holds open the glove box door when the glove box door is opened to a certain position. This further provides convenience to the user, enabling them to use both hands to access the interior space in the glove box.

FIG. 1A is an isometric view of a detent device 100. As depicted, detent device 100 includes curved plate 102, ball plunger 104, ball plunger 106, housing 108, and housing 110. In one aspect, curved plate 102 is formed in the shape of (and includes) a curved surface that conforms to a corresponding curved surface on a vehicle glove box. Detent device 100 may be attached to the glove box surface using, for example, a strip of double-sided adhesive foam tape. For such an installation, one surface of the adhesive foam tape may be stuck to a surface of detent device 100, and the other surface of the adhesive foam tape (including the detent device) may be stuck to the curved surface of the glove box.

Detent device 100 also includes ball plunger 104 and ball plunger 106 installed on detent device 100. Each of ball-plunger may 104 and 106 be spring-loaded, to depress under external pressure or force, and return back to an original position when the external pressure or force is released.

Each of ball plunger 104 and 106 may be held in place by housing 108 and housing 110, respectively. In one aspect, curved surface 102 is comprised of molded plastic or injected plastic, to include housings 108 and 110.

Figure 1B:
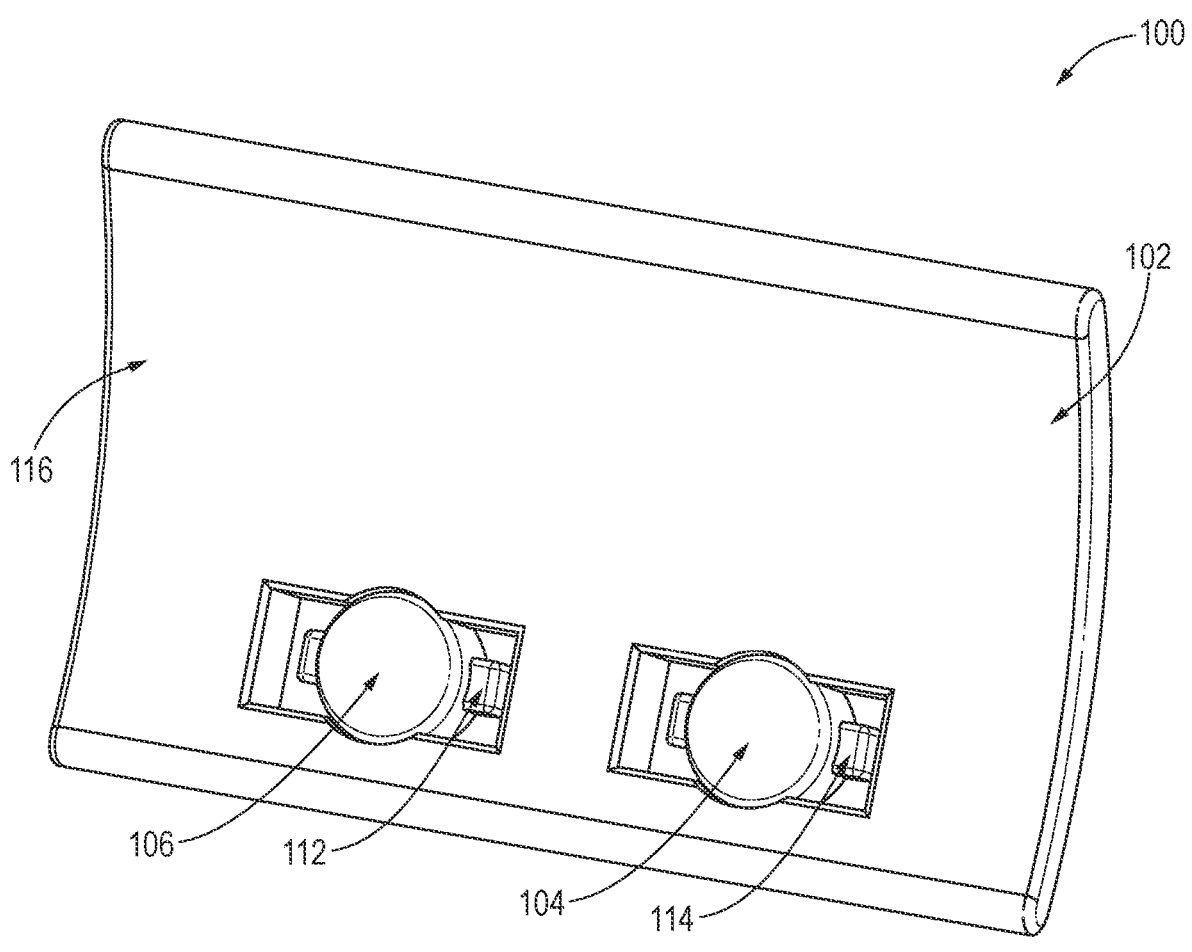
FIG. 1B is an isometric view of a detent device.

FIG. 1B is an isometric view of detent device 100. FIG. 1B presents an alternate view of detent device 100. As depicted, detent device 100 includes curved plate 102, ball plungers 104 and 106, spring tab 112, and spring tab 114. In one aspect, spring tabs 112 and 114 hold ball plungers 106 and 104 in place respectively, preventing ball plungers 104 and 106 from falling out of detent device 100.

Detent device 100 also includes surface 116. Surface 116 may be configured to conform to a curved surface on the vehicle glove box. Detent device 100 may be affixed onto this curved surface with surface 116 forming an interface between detent device 100 and the curved surface on the vehicle glove box. In one aspect, double-sided adhesive tape may be attached to one or more areas on surface 116, and the other side of the double-sided adhesive tape may be used to adhere or affix detent device 100 onto the curved surface on the vehicle glove box.

When the glove box door is opened by a user, the door may be opened to a first spatial position where each of ball plunger 104 and 106 contacts (e.g., is pushed against) an edge of the glove box. When a further force is applied to open the door beyond the first spatial position, each of ball plunger 104 and 106 retracts against spring loading due to a force exerted by an edge of the glove box opening. In other words, each of ball plunger 104 and 106 is depressed against spring tension from a first and second resting state, respectively. The depressed states of the ball plungers 104 and 106 allow the door of the glove box to be opened beyond the first spatial position.

When the door is extended beyond the first spatial position, (e.g., when the glove box door is fully opened), ball plungers 104 and 106 extend under spring loading to their extended (original) states (i.e., the first and second resting states, respectively). In this state, ball plungers 104 and 106 rest on the edge of the glove box opening and support the weight of the open glove box door, at a second spatial position. The tension in the spring in each of ball plunger 104 and 106 is designed to be such that the weight of an open glove box door exerted on each ball plunger is less than an amount of force needed to depress the ball-plunger. This allows detent device 100 to support the open glove box door without closing on itself.

In one aspect, detent device 100 holds the glove box open until a push of the door by a user towards a closed position overcomes the spring tension in each of ball plungers 104 and 106 that hold the door open. During a process to close the door, when a further force is applied to push the door beyond the second spatial position in a direction to close the door, each of ball plunger 104 and 106 retracts against spring loading due to a force exerted by an edge of the glove box opening. In other words, each of ball plunger 104 and 106 is depressed against spring tension from a first and second resting state, respectively. The depressed states of the ball plungers 104 and 106 allow the door of the glove box to be moved beyond the second spatial direction, in a direction towards closing the door. When the external applied force overcomes the spring loading in a combination of ball plungers 104 and 106, the door can be closed.

The design of detent device 100 allows detent device 100 to be installed with a strip of double-sided foam tape to hold the detent device in place on a cylinder hinge associated with the vehicle glove box. In one aspect, when the glove box door is opened, ball plungers 104 and 106 depress upon contact of the rear edge of the glove box. Upon raising (opening) the glove box door fully open, ball plungers 104 and 106 return to their respective resting states (i.e., to the first and second resting states, respectively), and hold the door open.

In one aspect, the two spring tabs 114 and 112 associated with ball plungers 104 and 106, respectively, are part of an injected plastic body associated with detent device 100, where ball plungers 104 and 106 are installed into. Spring tabs 112 and 114 provide enough pressure against each ball-plunger to keep them in place in the presence of vibration while the vehicle (e.g., a car or a motorcycle) is running. This provides the mechanical retention without the necessity of glue or some other mechanical retainer.

Figure 2A:
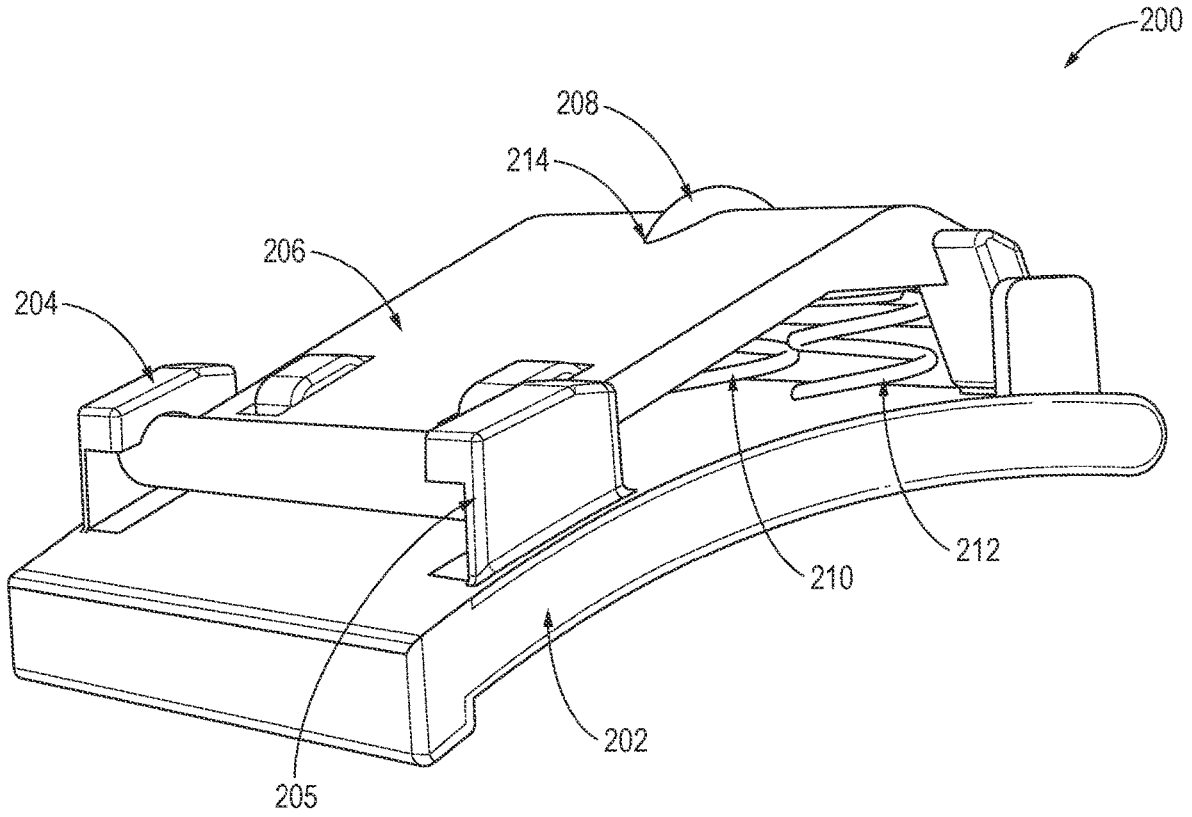
FIG. 2A is an isometric view of a detent device.

FIG. 2A is an isometric view of a detent device 200. As depicted, detent device 200 includes curved plate 202, hinge 204, hinge 205, ramp plate 206, ball bearing 208, springs 210 and 212, and hole 214. In one aspect, curved plate 202 is formed in the shape of (and includes) a curved surface that conforms to a corresponding curved surface on a vehicle glove box. Detent device 200 may be attached to the glove box surface using, for example, a strip of double-sided adhesive foam tape. For such an installation, one surface of the adhesive foam tape may be stuck to a surface of detent device 200, and the other surface of the adhesive foam tape (including the detent device) may be stuck to the curved surface of the glove box.

In one aspect, ramp plate 206 and curved plate 202 enclose, hold in, and constrain ball bearing 208 and springs 210 and 212. A diameter of hole 214 can be designed to be smaller than a diameter of ball bearing 208, so that only a portion of ball bearing 208 extends out of hole 214 and through the ramp plate 206. This further serves to constrain ball bearing 208, and springs 210 and 212.

Collectively, constrained ball bearing 208 and springs 210 and 212 function similar to a ball plunger. In an absence of ball bearing 208 and springs 210 and 212, ramp plate 206 is free to move (i.e., rotate about hinges 204 and 205) between a first position where ramp plate 206 is in contact with curved plate 202, and a second position away from curved plate 202 where ramp plate 206 is held at the second position via a mechanical stop (not illustrated).

With no external forces applied and in the presence of ball bearing 208 and springs 210 and 212, ramp plate 206 is held at the second position due to a spring tension exerted by springs 210 and 212 on ball bearing 208. This spring tension is transferred by ball bearing 208 to ramp plate 208, via hole 214.

Ramp plate 206 and curved plate 202 can be squeezed towards each other (i.e., ramp plate 206 can be moved towards the first position) by one or more external forces, against the spring tension exerted by a combination of ball bearing 208 and springs 210 and 212, at hole 214. When the external forces are released, ramp plate 206 returns back to the second position under spring tension from springs 210 and 212, applied via ball bearing 208.

Figure 2B:
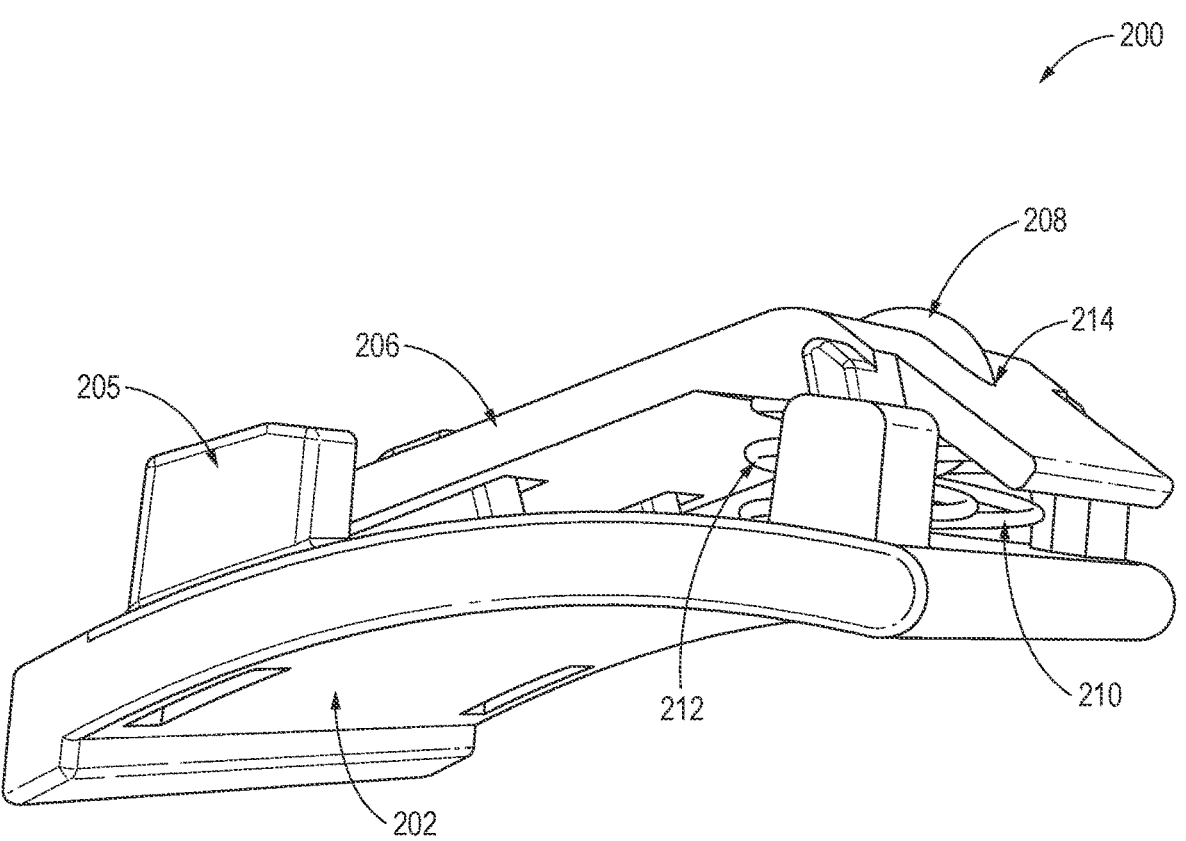
FIG. 2B is an isometric view of a detent device.

FIG. 2B is an isometric view of detent device 200. FIG. 2B depicts an alternate view of detent device 200, showing curved plate 202, hinge 205, ramp plate 206, ball bearing 208, springs 210 and 212, and hole 214. In this view, a curved surface of curved plate 202 is shown; curved plate 202 may be affixed (e.g., adhered) to a curved surface of the vehicle glove box, with the curved surface on detent device 200 forming an interface between detent device 200 and the curved surface on the vehicle glove box. In one aspect, double-sided adhesive tape may be attached to one or more areas on this surface of detent device 200, and the other side of the double-sided adhesive tape may be used to adhere or affix detent device 200 onto the curved surface on the vehicle glove box.

Figure 2C:
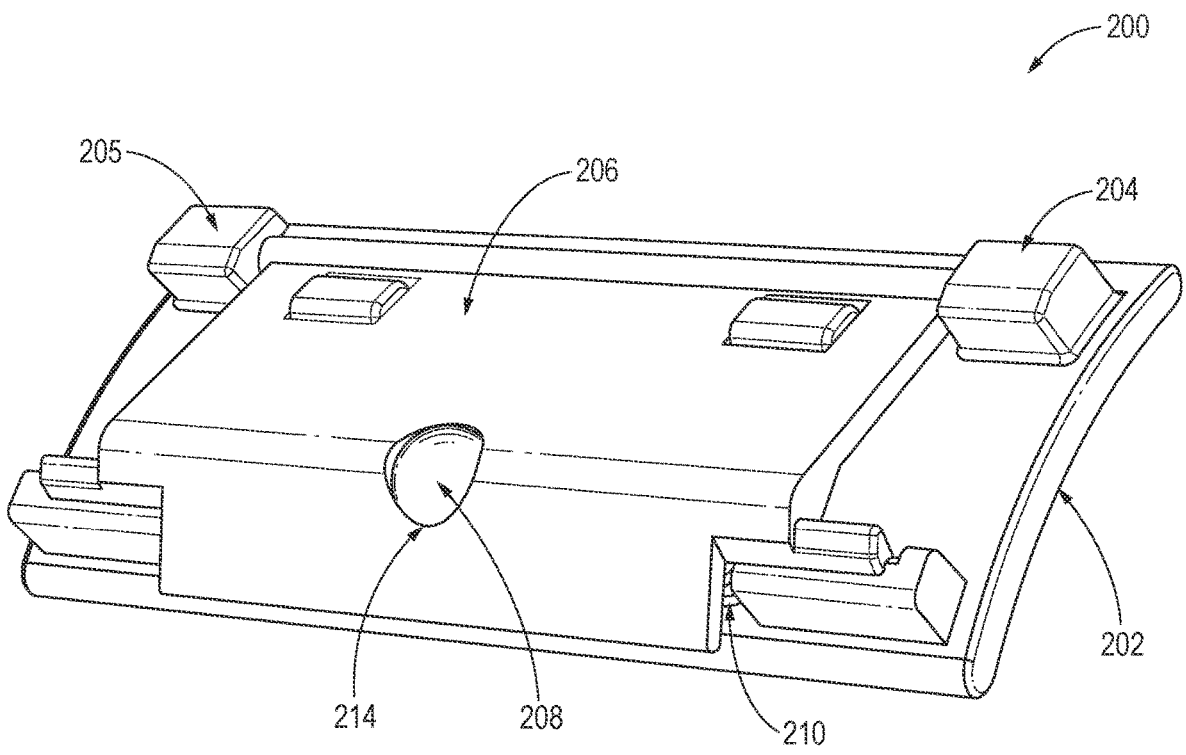
FIG. 2C is an isometric view of a detent device.

FIG. 2C is an isometric view of detent device 200. FIG. 2C depicts an alternate view of detent device 200, showing curved plate 202, hinges 204 and 205, ramp plate 206, ball bearing 208, spring 210, and hole 214.

When the glove box door is opened by a user, the door may be opened to a first spatial position where each of ball bearing 208 and ramp plate 206 contacts (e.g., is pushed against) an edge of the glove box. When a further force is applied to open the door beyond the first spatial position, each of ball bearing 208 and ramp plate 206 retracts against spring loading from springs 210 and 212, due to a force exerted by an edge of the glove box opening. In other words, ramp plate 206 is displaced from the second position by the external force. The depressed states of the ball bearing 208 and ramp plate 206 allow the door of the glove box to be opened beyond the first spatial position.

When the door is extended beyond the first spatial position, (e.g., when the glove box door is fully opened), ball bearing 208 and ramp plate 206 extend under spring loading (from springs 210 and 212) to rest on the edge of the glove box opening and support the weight of the open glove box door, at a second spatial position. The spring tension provided by springs 210 and 212 as transmitted via ball bearing 208 is designed to be such that the weight of an open glove box door exerted on ball bearing 208 and ramp plate 206 is less than an amount of force needed to depress ball bearing 208 and ramp plate 206 against spring tension. This allows detent device 200 to support the open glove box door without closing on itself.

In one aspect, detent device 200 holds the glove box open until a push of the door by a user towards a closed position overcomes the spring provided by springs 210 and 212 as transmitted via ball bearing 208 that holds the door open. During a process to close the door, when a further force is applied to push the door beyond the second spatial position in a direction to close the door, each of ball bearing 208 and ramp plate 206 retracts against spring loading due to a force exerted by an edge of the glove box opening. In other words, each of ball bearing 208 and ramp plate 206 is depressed against spring tension provided by springs 210 and 212. The depressed states of ball bearing 208 and ramp plate 206 allow the door of the glove box to be moved beyond the second spatial direction, in a direction towards closing the door. When the external applied force overcomes the spring loading in a combination of ball bearing 208 and ramp plate 206, the door can be closed.

In one aspect, a combination of ball bearing 208 and ramp plate 206 forms a self-adjusting mechanical system, where ramp plate 206 is effectively a spring-loaded ramp that operates independently of the (spring-loaded) ball bearing 208. This structure ensures that ramp plate 206 is always going to be pressed up against the back of the glove box rear edge, and ball bearing 208 will be at the same place regardless of where the ramp sits, and will depress first when pressure (e.g., external force) is applied to close the door. Because of the self-adjusting nature of the two different pieces (i.e., ramp plate 208 and ball plunger 208) working together but independently, ramp plate 206 sets ball bearing 208 as close as possible to the edge of the glove box. A combination of ramp plate 206, ball bearing 208, and springs 210 and 212 perform a detent action at roughly the same relative location regardless of the gap between each of hinge 205 and 206 and the glove box edge. This self-adjusting nature of detent device 200 allows detent device 200 to be mounted on a glove box door without needing exact mounting tolerances, while still providing the required functionality. Spring tabs (not illustrated) provide enough pressure against each ball-plunger to keep them in place in the presence of vibration while the vehicle (e.g. a car or a motorcycle) is running. This provides the mechanical retention without the necessity of glue or some other mechanical retainer.

The detent devices described herein provide a convenience of a glove box door being held open so one can retrieve and/or put something away with one hand instead of the current method of holding the door open with one hand and reaching into the box with the other hand. This is also very convenient for cleaning a bike or connecting a user's phone to a cable (e.g., a USB cable) that is usually inside the glove box.

The detent devices described herein may be constructed from a variety of materials, using a variety of manufacturing techniques. For example, different types of plastics may be used to form a detent device via processes such as injection molding. In other embodiments, A detent device may be made from cast or stamped metal.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. An apparatus comprising:
a curved plate including a first surface and a second surface, wherein the first surface is configured to conform to a curvature of a curved portion of a door of a vehicle glove box;
a first ball plunger attached to the curved plate; and
a second ball plunger attached to the curved plate, wherein:
the curved plate is adhered to the curved portion of the door via the first surface;
when the door is opened via a first external force to a first spatial position, the first ball plunger and second ball plunger are pushed against an edge of the vehicle glove box;
with a further force applied to extend the door beyond the first spatial position, the first ball plunger and the second ball plunger are depressed by the edge from a first resting state and a second resting state, respectively, allowing the door to be extended beyond the first spatial position; and
when the door is extended beyond the first spatial position, the first ball plunger and the second ball plunger return to the first resting place and the second resting place, respectively, and the door is held open at a second spatial position by the first ball plunger and the second ball plunger resting against the edge.

2. The apparatus of claim 1, wherein when a second external force is applied to close the door held open at the second spatial position:
the first ball plunger and the second ball plunger are depressed by the edge from the first resting state and the second resting state, respectively, allowing the door to be extended beyond the second spatial position; and
when the door is extended beyond the second spatial position, the first ball plunger and the second ball plunger return to the first resting place and the second resting place, respectively, and the door can be closed.

3. The apparatus of claim 1, wherein the first ball plunger and the second ball plunger collectively function as a latch to hold the door open.

4. The apparatus of claim 1, wherein each of the first ball plunger and the second ball plunger comprises a spring-loaded ball bearing.

5. The apparatus of claim 4, wherein the spring loading is provided by a spring tab for each of the first ball plunger and the second ball plunger.

6. The apparatus of claim 5, wherein the spring loading balances a weight of the door when the door is held open.

7. The apparatus of claim 4, wherein each of the first ball plunger and the second ball plunger is motion-limited by a respective tab included in the curved plate.

8. The apparatus of claim 1, wherein the curved plate is adhered to the curved portion of the door by any combination of adhesive, double-sided tape, and double-sided foam tape.

9. The apparatus of claim 1, wherein the curved plate is comprised of an injected plastic body.

10. The apparatus of claim 1, wherein the vehicle is a motorcycle.

11. The apparatus of claim 1, wherein the spring loading balances a weight of the door when the door is held open.

12. An apparatus comprising:
a curved plate including a first surface and a second surface, wherein the first surface is configured to conform to a curvature of a curved portion of a door of a vehicle glove box;
a ramp plate attached to the curved plate on the second surface via a hinge, wherein the ramp plate is movable about the hinge, between a first plate position wherein the ramp plate is in contact with the curved plate and a second plate position wherein the ramp plate is in contact with a mechanical stop to limit a range of motion of the ramp plate about the hinge; and
a spring-loaded ball plunger enclosed between the curved plate and the ramp plate, wherein:
the curved plate is adhered to the curved portion of the door via the first surface;
the ball plunger is configured to hold the ramp plate at the second plate position via a spring action;
when the door is opened via a first external force to a first spatial position, the ball plunger and the ramp plate are pushed against an edge of the vehicle glove box;
with a further force applied to extend the door beyond the first spatial position, the ball plunger and the ramp plate are depressed by the edge so that the ramp plate moves from the second plate position in a direction towards the first plate position about the hinge, allowing the door to be extended beyond the first spatial position; and
when the door is extended beyond the first spatial position, an edge of the ramp plate rests on the edge of the vehicle glove box and the door is held open at a second spatial position by the spring action and the edge of the ramp plate resting against the edge of the vehicle glove box.

13. The apparatus of claim 12, wherein when a second external force is applied to close the door held open at the second spatial position:
the ball plunger and the ramp plate are depressed by the edge of the glove box, allowing the door to be extended beyond the second spatial position; and when the door is extended beyond the second spatial position, the ramp plate returns to the second plate position under the spring action, and the door can be closed.

14. The apparatus of claim 12, wherein the ball plunger and the ramp plate collectively function as a latch to hold the door open.

15. The apparatus of claim 12, wherein the ball plunger comprises a spring-loaded ball bearing.

16. The apparatus of claim 15, wherein the spring loading is provided by a spring tab for the ball plunger.

17. The apparatus of claim 12, wherein the curved plate is adhered to the curved portion of the door by any combination of adhesive, double-sided tape, and double-sided foam tape.

18. The apparatus of claim 12, wherein each of the curved plate and the ramp plate is comprised of an injected plastic body.

19. The apparatus of claim 12, wherein the vehicle is a motorcycle.

20. The apparatus of claim 12, wherein a combination of the ramp plate and the ball plunger comprises a self-adjusting mechanism that provides a door-open latching functionality for the door.

21. The apparatus of claim 12, wherein the spring loading balances a weight of the door when the door is held open.

\* \* \* \* \*